US012278446B2

(12) United States Patent
Peterson et al.

(10) Patent No.: US 12,278,446 B2
(45) Date of Patent: Apr. 15, 2025

(54) SELF-SEALING ELECTRICAL PLUG-AND-SOCKET ASSEMBLY

(71) Applicant: R.A. PHILLIPS INDUSTRIES, INC., Santa Fe Springs, CA (US)

(72) Inventors: Thomas Dale Peterson, Glendora, CA (US); Daniel William Forthoffer, Birmingham, MI (US)

(73) Assignee: R.A. Phillips Industries, Inc., Irvine, CA (US)

( * ) Notice: Subject to any disclaimer, the term of this patent is extended or adjusted under 35 U.S.C. 154(b) by 351 days.

(21) Appl. No.: 17/889,169

(22) Filed: Aug. 16, 2022

(65) Prior Publication Data

US 2023/0055937 A1 Feb. 23, 2023

Related U.S. Application Data

(60) Provisional application No. 63/234,655, filed on Aug. 18, 2021.

(51) Int. Cl.
*H01R 13/52* (2006.01)
*H01R 13/631* (2006.01)

(52) U.S. Cl.
CPC ..... *H01R 13/5213* (2013.01); *H01R 13/5205* (2013.01); *H01R 13/5219* (2013.01); *H01R 13/631* (2013.01)

(58) Field of Classification Search
None
See application file for complete search history.

(56) References Cited

U.S. PATENT DOCUMENTS 5,679,019 A * 10/1997 Sakai ................. H01R 13/5208 439/271
6,364,692 B1 * 4/2002 Okayasu ............ H01R 13/5219 439/204
6,743,025 B2 6/2004 Howard
(Continued)

FOREIGN PATENT DOCUMENTS

CA 3153981 A1 4/2021
CA 3154128 A1 5/2022
(Continued)

OTHER PUBLICATIONS

Canadian Examination Search Report issued in corresponding application No. 3,170,684, dated Nov. 14, 2023, 5 pages.
(Continued)

*Primary Examiner* — Tho D Ta
(74) *Attorney, Agent, or Firm* — Womble Bond Dickinson (US) LLP

(57) ABSTRACT

Provided is a plug-and-socket assembly including a plug configured to be electrically and mechanically coupled with a socket, and a cover configured to be mounted over a portion of the plug and a portion of the socket, the cover including a flange forming a first opening at a proximal end of the cover and configured to be coupled to the socket, a retaining portion forming a second opening at a distal end of the cover, and configured to secure a plug component between the flange and the retaining portion, and a cover body extending from the flange to the retaining portion and forming a longitudinal opening extending from the first opening to the second opening.

20 Claims, 15 Drawing Sheets

(56) References Cited

U.S. PATENT DOCUMENTS

| | | | | |
|---|---|---|---|---|
| 7,273,395 | B2 * | 9/2007 | Hayashi | H01R 13/506 439/587 |
| 8,192,216 | B1 | 6/2012 | Puluc et al. | |
| 8,876,539 | B2 | 11/2014 | Gette | |
| 8,894,426 | B2 | 11/2014 | Gette | |
| 10,389,061 | B2 * | 8/2019 | McDowell | H01R 13/4367 |
| 10,454,204 | B2 * | 10/2019 | Hara | H01R 13/5227 |
| 11,018,446 | B2 * | 5/2021 | Mamiya | H01R 13/4538 |
| 2014/0295683 | A1 | 10/2014 | Gette | |
| 2016/0268721 | A1 | 9/2016 | Harmon et al. | |
| 2019/0140389 | A1 * | 5/2019 | Yi | H01R 13/5205 |

FOREIGN PATENT DOCUMENTS

| | | | |
|---|---|---|---|
| DE | 202013101349 | U1 | 6/2013 |
| WO | WO 2022/098919 | A1 | 5/2022 |

OTHER PUBLICATIONS

Sae Jaefer GmbH + Co., KG, SAE J560, Retrieve at https://www.erich-jaeger.com/en-US/products/standards/sae-560, Aug. 15, 2022, 9 pages.

Sae Jaefer GmbH + Co., KG, Watertight SAE J560, (7 pin 12V) Socket—Erich Jaeger; Retrieve at https://www.youtube.com/watch?v=wULOJkF8b-c, Jan. 12, 2018, 4 pages.

* cited by examiner

SELF-SEALING ELECTRICAL PLUG-AND-SOCKET ASSEMBLY

CROSS-REFERENCE TO RELATED APPLICATION(S)

This application claims priority to, and the benefit of, U.S. Provisional Application Ser. No. 63/234,655, filed on Aug. 18, 2021, entitled "SELF-SEALING ELECTRICAL PLUG AND SOCKET ASSEMBLY," the entire content of which is incorporated herein by reference.

FIELD

Aspects of one or more embodiments according to the present disclosure relate to electrical plugs and sockets.

BACKGROUND

Heavy duty trucks and tractor trailers typically involve a semi-trailer truck, or a tractor-trailer, having a trailer connected thereto. The trailer typically requires one or more electrical systems associated with turn signals, hazard signals, brake signals, braking systems, system monitoring, lighting, etc. These electrical systems are typically controlled or monitored from within the cab of the semi/tractor. Accordingly, an electrical connection is typically required between the semi/tractor and the trailer. Because the trailer is typically detachable from the semi/tractor, the electrical connection therebetween is also typically detachable. This detachable electrical connection typically takes the form of a plug-and-socket connection, wherein the socket may have one or more electrical connections (e.g., male pins) for mating with corresponding electrical connections (e.g., female terminals) of the plug.

A problem commonly associated with plug-and-socket connections of the related art stems from moisture and debris reaching an interior of the socket cavity. The presence of moisture or debris may damage or corrode metallic connections, such as the electrical connections, which may in turn corrode, degrade, or otherwise negatively affect the electrical connections between the semi/tractor and the trailer. Also, replacing a socket often involves removing wired connections, which can increase installation time and difficulty.

The above information disclosed in this Background section is only for enhancement of understanding of the present disclosure, and therefore it may contain information that does not form the prior art that is already known to a person of ordinary skill in the art.

SUMMARY

Aspects of embodiments of the present disclosure relate to an improved plug-and-socket assembly, wherein a moisture and debris resistant seal is formed when the plug is mated with the corresponding socket, thereby extending the useful life of the plug, the socket, and the electrical connections between the semi/tractor and the trailer. In some embodiments, the improved plug-and-socket assembly includes components that simplify the manufacturing and assembly process and reduces overall cost.

Aspects of embodiments of the present disclosure relate to electrical plugs and sockets.

According to some embodiments of the present disclosure, there is provided a plug-and-socket assembly including a plug configured to be electrically and mechanically coupled with a socket, and a cover configured to be mounted over a portion of the plug and a portion of the socket, the cover including a flange forming a first opening at a proximal end of the cover and configured to be coupled to the socket, a retaining portion forming a second opening at a distal end of the cover, and configured to secure a plug component between the flange and the retaining portion, and a cover body extending from the flange to the retaining portion and forming a longitudinal opening extending from the first opening to the second opening.

The plug-and-socket assembly may further include the socket, wherein the socket includes a barrel that is configured to be inserted through the first opening.

The plug may include a plug body, a first seal at a proximal end of the plug body and including a flexible material configured to be compressed around a distal end of the socket, and a second seal at a distal end of the plug body and including a flexible material configured to be compressed around a wire of a cable.

The plug component may be the second seal and the retaining portion may be configured to secure the second seal to the distal end of the plug body by overlapping a portion of the second seal along a portion of a periphery of the distal end of the plug body.

The second seal may include a wire seal opening sleeve configured to be inserted through the second opening.

The second seal may form a plurality of wire seal openings configured to surround respective wires of the cable, portions of the second seal forming the plurality of wire seal openings may be integrally formed.

The plug body may include a proximal cavity at a proximal end of the plug body and a distal cavity at the distal end of the plug body.

The distal cavity may accommodates a terminal retainer forming a terminal hole including a latching mechanism, the latching mechanism may be configured to accommodate an insertion of a plug terminal through the terminal hole and to resist a removal of the plug terminal from the terminal hole.

The terminal retainer may be located at a proximal end of the distal cavity and the second seal may be located at a distal end of the distal cavity.

The proximal cavity may be separated from the distal cavity by a mounting floor forming a terminal hole to spatially connect the proximal cavity with the distal cavity, the proximal cavity accommodating the first seal.

The first seal may include one or more semicircular grooves configured to match an exterior form of the distal end of the socket.

The longitudinal opening may be configured to allow the cover to be fitted over a plug body.

A distal end of the cover body may include a groove configured to be coupled with a latching portion of a plug back cover.

According to other embodiments of the present disclosure, there is provided a cover including a flange forming a first opening at a proximal end of the cover and configured to be coupled to a socket, a retaining portion forming a second opening at a distal end of the cover, and configured to secure a component of a plug between the flange and the retaining portion, and a cover body extending from the flange to the retaining portion and configured to be mounted over a portion of the plug and a portion of the socket, the cover body forming a longitudinal opening extending from the first opening to the second opening.

The first opening may be configured to accommodate the socket.

The longitudinal opening may be configured to allow the cover to be fitted over a plug body.

According to other embodiments of the present disclosure, there is provided a plug including a plug body, a first seal at a proximal end of the plug body and including a flexible material configured to be compressed around a distal end of a socket, and a second seal at a distal end of the plug body and including a flexible material forming a plurality of wire seal openings, the second seal may be configured to be compressed around a plurality of wires, and be secured to the distal end of the plug body by a retaining portion of a removable cover, the retaining portion extending along a periphery of the distal end of the plug body.

Portions of the second seal forming the plurality of wire seal openings may be integrally formed.

The plug body may include a proximal cavity at a proximal end of the plug body and a distal cavity at the distal end of the plug body.

The distal cavity may accommodate a terminal retainer forming a terminal hole including a latching mechanism, the latching mechanism may be configured to accommodate an insertion of a plug terminal through the terminal hole and to resist a removal of the plug terminal from the terminal hole.

Although much of the following description describes plugs (e.g., electrical plugs) and corresponding sockets, embodiments of the present disclosure may also take the form of other types of plugs and corresponding sockets.

BRIEF DESCRIPTION OF THE DRAWINGS

Non-limiting and non-exhaustive embodiments of the present disclosure are described with reference to the following figures, wherein like reference numerals refer to like parts throughout the various views unless otherwise specified.

Figure 1:
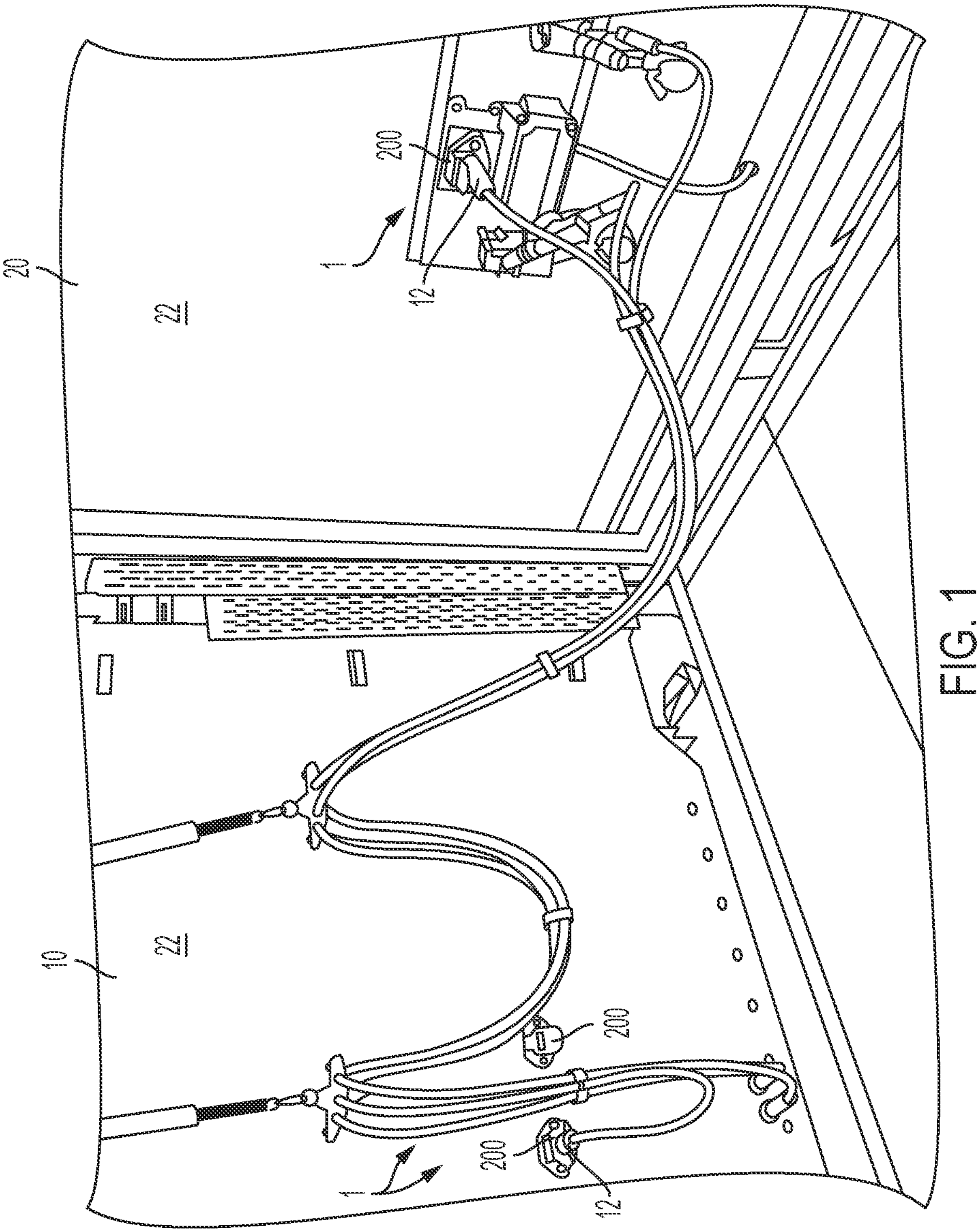
FIG. 1 illustrates the use of a self-sealing plug-and-socket assembly to make an electrical connection between a tractor and trailer, according to some embodiments of the present disclosure.

Corresponding reference characters indicate corresponding components throughout the several views of the drawings. Skilled artisans will appreciate that elements in the figures are illustrated for simplicity and clarity, and have not necessarily been drawn to scale. For example, the dimensions of some of the elements, in the figures may be exaggerated relative to other elements to help to improve clarity and understanding of various embodiments. Also, common but well-understood elements and parts not related to the description of the embodiments might not be shown in order to facilitate a less obstructed view of these various embodiments and to make the description clear.

DETAILED DESCRIPTION

Features of the inventive concept and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described.

Unless otherwise noted, like reference numerals, characters, or combinations thereof denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the detailed description, for the purposes of explanation, numerous specific details are set forth to provide a thorough understanding of various embodiments. It is apparent, however, that various embodiments may be practiced without these specific details or with one or more equivalent arrangements.

It will be understood that, although the terms "zeroth," "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "on," "connected to," or "coupled to" another element or component, it can be directly on, connected to, or coupled to the other element or component, or one or more intervening elements or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or component is referred to as being "between" two elements or components, it can be the only element or component between the two elements or components, or one or more intervening elements or components may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, each of the terms "or" and "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Also, the term "exemplary" is intended to refer to an example or illustration. Further, the use of "may" when describing embodiments of the present disclosure refers to "one or more embodiments of the present disclosure."

When one or more embodiments may be implemented differently, a specific process order may be performed differently from the described order. For example, (i) the disclosed operations of a process are merely examples, and may involve various additional operations not explicitly covered, and (ii) the temporal order of the operations may be varied.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Exemplary embodiments of the present disclosure are described with reference to FIGS. 1-14D below. Plugs (e.g., electrical plugs) of the exemplary embodiments of the present disclosure, as well as socket assemblies of the exemplary embodiments of the present disclosure, incorporate numerous aspects, and it should be noted that the present disclosure is not restricted to the exemplary embodiments, as various combinations of the described aspects may be made without departing from the spirit and scope of the present disclosure.

FIG. 1 illustrates the use of a self-sealing plug-and-socket assembly to make an electrical connection between a tractor and trailer, according to some embodiments of the present disclosure.

Referring to FIG. 1, as discussed above, a heavy-duty truck may involve a tractor 20 having a trailer 10 connected thereto. The trailer 10 may include one or more electrical systems associated with turn signals, hazard signals, brake signals, braking systems, system monitoring, lighting, etc. These electrical systems may be controlled or monitored from within the cab of the tractor 20. Accordingly, an electrical connection may be provided between the tractor 20 and the trailer 10. Because the trailer 10 may be detachable from the tractor 20, an electrical connection therebetween may also be detachable. The detachable electrical connection may include a plug-and-socket connection. For example, the connection may be implemented by using a socket 200 that is configured to be electrically and mechanically coupled with an external plug 12. As used herein, "electrically and mechanically coupled" means that: (i) two components are electrically coupled with one another, such that electricity may be conducted between the two components; and (ii) the two components are mechanically coupled with one another, such that mechanical forces are applied to physically hold the two components together (with or without intervening components).

According to aspects of embodiments of the present disclosure, the socket 200 may reduce (e.g., prevent) problems commonly associated with conventional plug-and-socket connections. For example, aspects of embodiments of the present disclosure provide a plug-and-socket assembly 1 that may reduce (e.g., prevent) moisture and debris from reaching an interior of the socket 200. Thus, aspects of embodiments of the plug-and-socket assembly 1 according to the present disclosure may reduce (e.g., prevent) moisture or debris from damaging or corroding metallic connections, such as the electrical connections of the socket 200, which might otherwise corrode, degrade, or otherwise negatively affect the electrical connections between the tractor 20 and the trailer 10. Additionally, aspects of embodiments of the plug-and-socket assembly 1 according to the present disclosure may have a prolonged useful life beyond the useful life of conventional plug-and-socket assemblies, thereby reducing (e.g., eliminating) replacement and installation costs. Furthermore, the components of the plug-and-socket assembly 1 according to the present disclosure may include relatively simple structures that may be manufactured and assembled at reduced costs when compared to more complex designs.

In some embodiments, the plug-and-socket assembly 1 may be mounted (e.g., coupled) to a wall 22 of the trailer 10 or a wall 22 of the tractor 20. For example, the plug-and-socket assembly 1 may be mounted directly to the wall 22 or the plug-and-socket assembly 1 may be mounted to a bracket that is coupled to the wall 22. As will be discussed in further detail below, in some embodiments (see, e.g., FIGS. 2, 3A, and 3B), the plug-and-socket assembly 1 may include a socket 200 and a plug 100 having a cable 110 that extends axially from (e.g., straight out from) the socket 200 and the plug 100. In some embodiments (see, e.g., FIGS. 10, 11, 12A, and 12B), a plug-and-socket assembly 1' may include a socket 200' and a plug 100' having a cable 110' that extends laterally from (e.g., at a right angle from) the socket 200' and the plug 100'. Although some features are described below with respect to the socket 200 and the plug 100 having the cable 110 that extends axially from the socket 200 and the plug 100, and some features are described below with respect to the socket 200' and the plug 100' having the cable 110' that extends laterally from (e.g., at a right angle from) the socket 200' and the plug 100', the features of the present disclosure are not limited thereto. For example, many of the features discussed with respect to aspects of embodiments of the present disclosure depicted in FIGS. 2, 3A, and 3B may be incorporated into aspects of embodiments of the present disclosure depicted in FIGS. 10, 12A, and 12B, and vice versa.

Figure 2:
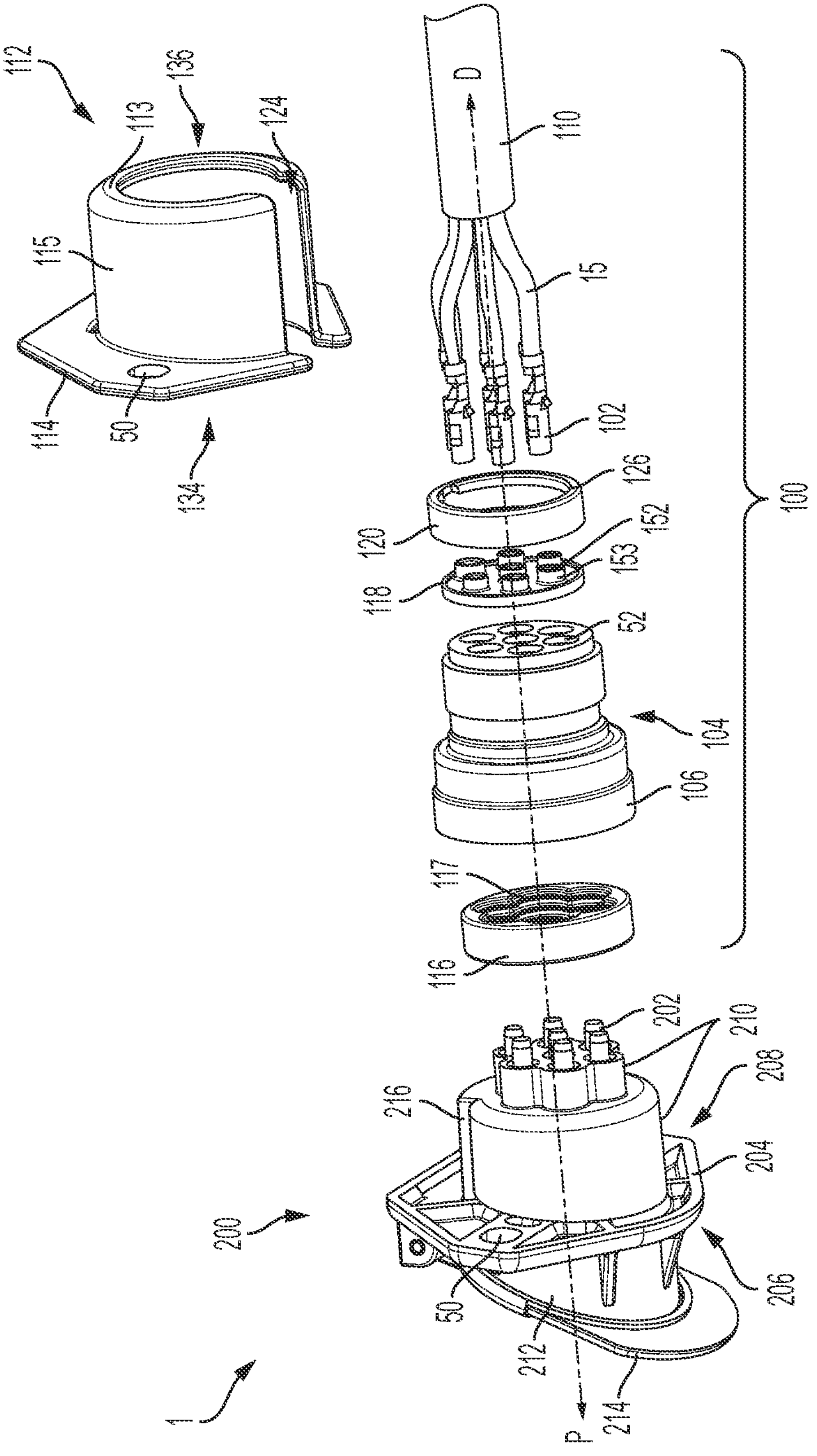
FIG. 2 illustrates an exploded view of the plug-and-socket assembly, according to some embodiments of the present disclosure.

FIG. 2 illustrates an exploded view of the plug-and-socket assembly 1, according to some embodiments of the present disclosure.

Referring to FIG. 2, for ease of description, reference to a "proximal end" (e.g., a proximal end P) of a component, shall generally refer to a portion of the component that is most proximate to a spring-loaded cap 214 of the plug-and-socket assembly 1 (e.g., a portion of the component that is least proximate to a cable 110 of the plug-and-socket assembly 1), while reference to a "distal end" (e.g., a distal end D) of the component, shall generally refer to a portion of the component that is least proximate to the spring-loaded cap 214 of the plug-and-socket assembly 1 (e.g., a portion of the component that is most proximate to the cable 110 of the plug-and-socket assembly 1).

As will be discussed in further detail below, in some embodiments, the plug-and-socket assembly 1 may include a socket 200 (e.g., a socket assembly), a plug 100 (e.g., an electrical plug assembly), and a cover 112 (e.g., an insert cover).

In some embodiments, the socket 200 may include the spring-loaded cap 214, a socket sleeve 212, a socket flange 204 (e.g., a mounting flange), a barrel 210 (e.g., a socket barrel), an orienting key projection 216, and socket terminals 202 (e.g., socket rear male terminals). The socket flange 204 may include a socket flange proximal face 206 and a socket flange distal face 208. The socket flange 204 may include one or more mounting holes 50. The barrel 210 may be located at a distal end of the socket 200 and may have the socket terminals 202 extending therefrom.

In some embodiments, the plug 100 may include a plug body 104 (e.g., an insert). The plug body 104 may include a wiper seal 116 (e.g., a first seal) at a proximal end of the plug body 104. The wiper seal 116 may include one or more wiper seal grooves 117. A wiper seal groove 117 may be configured to match an exterior form of the distal end of the socket 200. For example, the wiper seal groove 117 may include one or more semicircular grooves to match an exterior form of the barrel 210. The plug body 104 may include a wire seal 118 (e.g., a second seal) at a distal end of the plug body 104. The wire seal 118 may include a plurality of wire seal openings 152. The wire seal 118 may include a plurality of wire seal opening sleeves 153, formed around corresponding ones of the plurality of wire seal openings 152. In some embodiments the plug 100 may include a retaining ring 120 (e.g., wire seal retaining ring). The retaining ring 120 may include a retaining edge 126 for securing the wire seal 118 to the distal end of the plug body 104. In some embodiments, the plug 100 may include a cable 110 (e.g., a multi-conductor electrical cable or plug cable). The cable 110 may include one or more wires 15. The wires 15 may be coupled with plug terminals 102 (e.g., plug female terminals).

In some embodiments, the cover 112 may include a cover flange 114 (e.g., a plug flange), a cover body 115, and a cover retaining portion 113. The cover flange 114 may include one or more mounting holes 50, respectively corresponding to the one or more mounting holes 50 of the socket flange 204. The cover flange 114 may be configured to be coupled to the socket 200. The cover flange 114 may have a flange opening 134 (e.g., a first opening) at a proximal end of the cover 112. The flange opening 134 may be configured to accommodate the barrel 210. For example, the barrel 210 may be configured to be inserted through the flange opening 134. The cover retaining portion 113 may form a retainer opening 136 (e.g., a second opening) at a distal end of the cover 112. In some embodiments, the retainer opening 136 may have a smaller diameter than the flange opening 134. The cover retaining portion 113 may be configured to secure a plug component between the cover flange 114 and the cover retaining portion 113 when the cover 112 is mounted over a portion of the plug 100 and over a portion of the socket 200. The cover body 115 may extend from the cover flange 114 to the cover retaining portion 113 and may form an opening (e.g., a longitudinal opening) extending from the flange opening 134 to the retainer opening 136. In some embodiments, the cover flange 114, the cover body 115, and the cover retaining portion 113 may be integrally formed (e.g., monolithically formed) as one component (or body).

In some embodiments, the wiper seal 116 and/or the wire seal 118 may include a relatively soft material (e.g., a relatively flexible material). For example, the relatively soft material may include (e.g., may be) an elastomer such as Ethylene Propylene Diene Monomer (EPDM), Nitrile, or Silicone. The soft material may have a 50A durometer.

In some embodiments, the plug body 104 may include (e.g., may be) a relatively rigid plastic material. For example, the relatively rigid plastic material may include glass filled nylon.

In some embodiments, the cover 112 may be a semi-rigid plastic material. For example, the cover 112 may be more rigid than the wiper seal 116 and the wire seal 118, and the cover 112 may be less rigid than the plug body 104. For example, the semi-rigid plastic material may include nylon.

In some embodiments, the socket 200 may include a rigid plastic material. In some embodiments, the retaining ring may include a rigid plastic material.

Figure 3A:
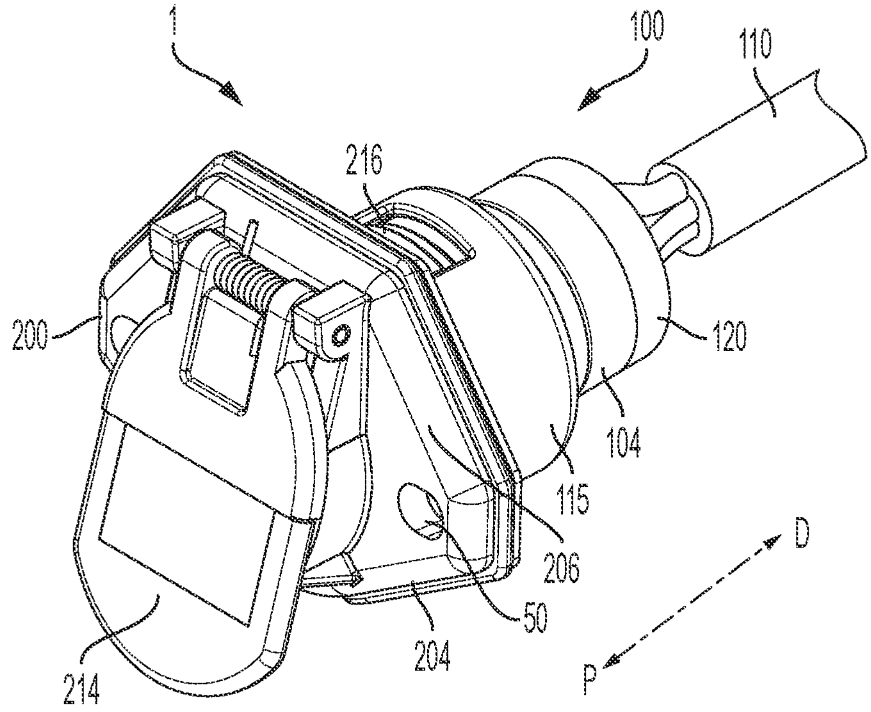
FIGS. 3A-3B illustrate perspective views of the plug-and-socket assembly in a mated state, according to some embodiments of the present disclosure.
Figure 3B:
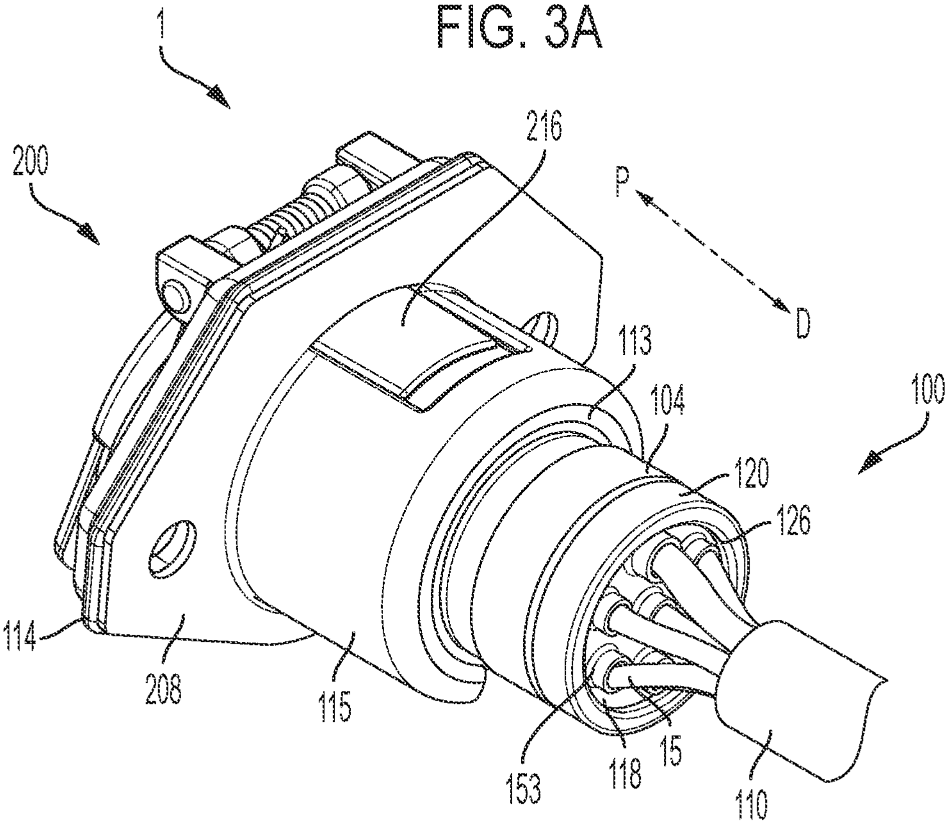

FIGS. 3A-3B illustrate perspective views of the plug-and-socket assembly in a mated state, according to some embodiments of the present disclosure.

Figure 3C:
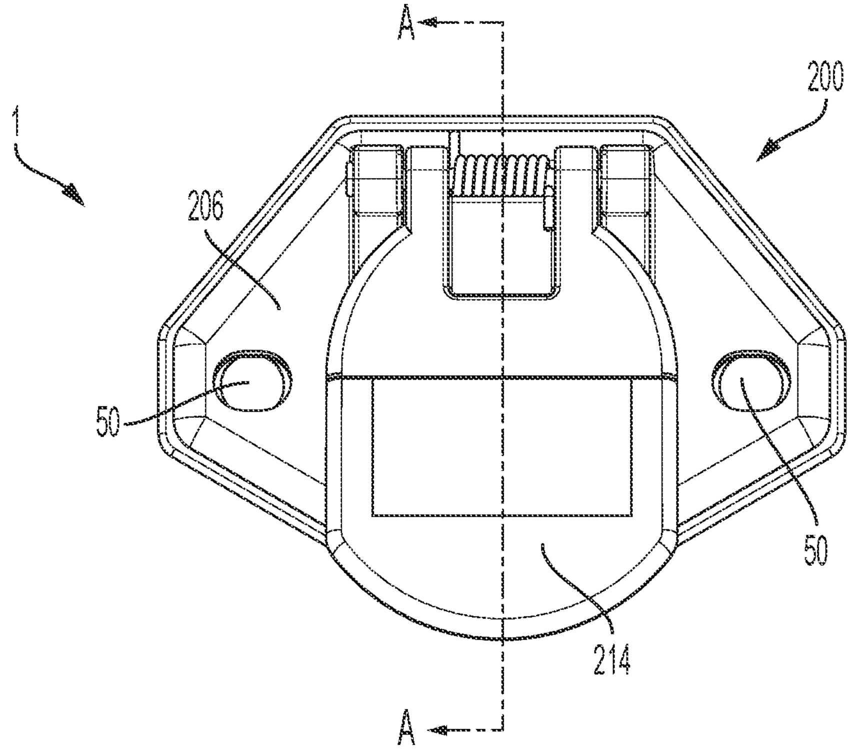
FIGS. 3C-3D respectively illustrate a proximal view of the socket assembly and a longitudinal cross-sectional view of the plug-and-socket assembly in the mated state taken along line AA, according to some embodiments of the present disclosure.
Figure 3D:
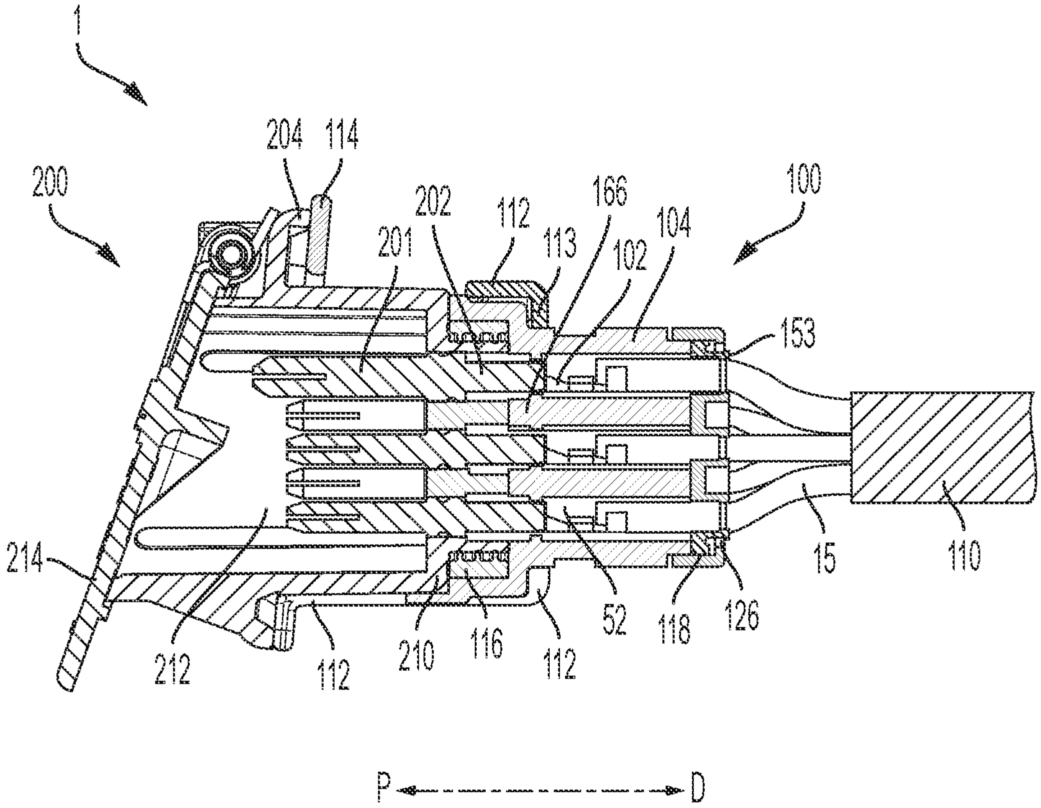

FIGS. 3C-3D respectively illustrate a proximal view of the socket assembly and a longitudinal cross-sectional view of the plug-and-socket assembly in the mated state taken along line AA, according to some embodiments of the present disclosure.

Figure 4:
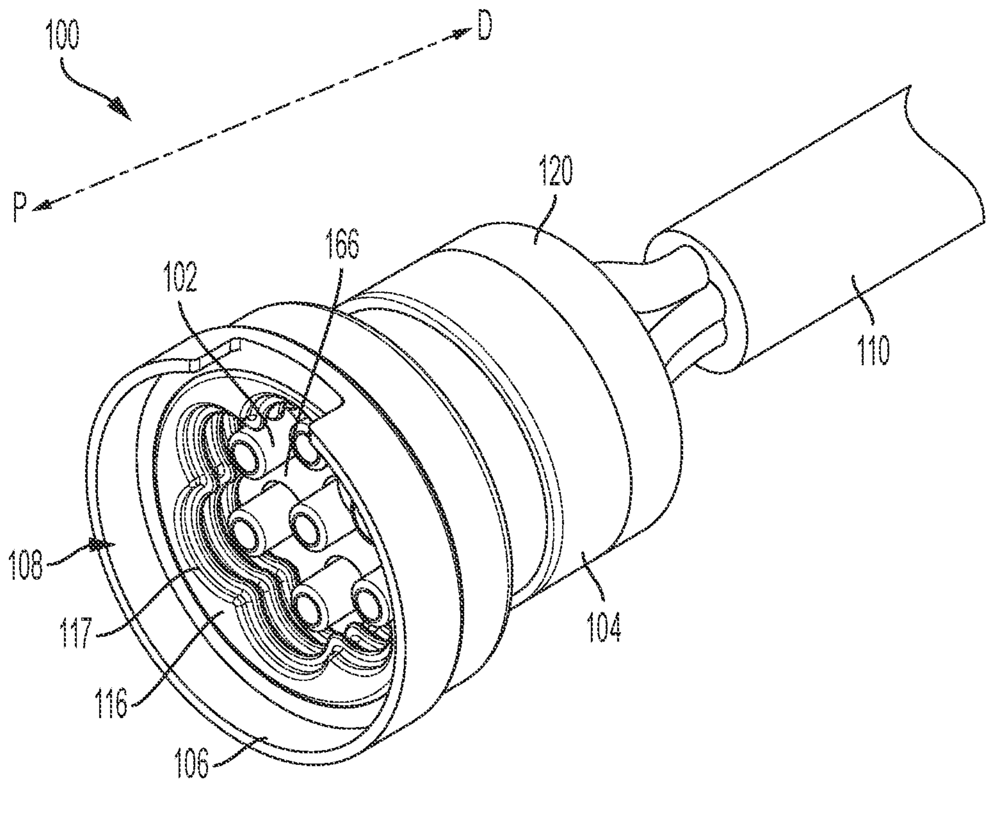
FIG. 4 illustrates a perspective view of the plug, according to some embodiments of the present disclosure.

FIG. 4 illustrates a perspective view of the plug, according to some embodiments of the present disclosure.

Referring to FIGS. 3A-4, the plug 100 and the socket 200 of the present disclosure may be installed on a wall 22 of a tractor 20 or trailer 10 (see FIG. 1). For example, a wall 22 may include a plug-and-socket mounting hole (e.g., a socket barrel receiving hole) for mounting the socket 200 and the plug 100 thereto. In some embodiments, the plug-and-socket assembly 1 may be mounted to a wall 22 of the tractor 20 or the trailer 10 by: (i) connecting the socket 200 to the plug 100 at an exterior side of the wall; (ii) mounting the cover body 115 over a portion of the plug body 104 and a portion of the socket 200 by inserting the plug body 104 and the socket 200 through the longitudinal opening 124 of the cover 112 (see FIG. 2), lining up the orienting key projection 216 with a keyway opening 122 in the cover 112 (see FIG. 5A), and lining up the mounting holes 50 of the cover 112 with the mounting holes 50 of the socket flange 204; (iii) inserting the cover body 115 and the plug body 104 through the plug-and-socket mounting hole from the exterior side of the wall to the interior side of the wall; and (iv) fastening the plug-and-socket assembly 1 to the wall 22 with fastening hardware inserted through the mounting holes 50.

Referring to FIG. 3D, when the plug 100 is mated with (e.g., is electrically and mechanically coupled with) the socket 200, the socket terminals 202 (e.g., socket rear male terminals) may be electrically connected to and mated with the plug terminals 102 (e.g., plug female terminals). In some embodiments, the socket terminals 202 may extend from the distal end of the barrel 210, which projects beyond the socket flange distal face 208. The socket flange 204 may be generally polygonal (e.g., heptagonal) and made of a hardened material, such as die cast metal or glass filled molded nylon, and/or the like.

A socket sleeve 212 may be generally annular and may be integrally formed from the same material as the socket flange 204. The barrel 210 may include (e.g., carry) a plurality of pins 201 (e.g., seven male pins) in an array (e.g., per SAE standard J650). Each of the pins 201 may be coupled to (e.g., integrally formed with) rear ends (e.g., proximal ends) of respective ones of the socket terminals 202. The pins 201 may extend into the inside of the socket sleeve 212 and form a socket into which an end of an electrical cable may be plugged (e.g., via external plug 12 as shown in FIG. 1), such as the electrical harness connecting a tractor 20 to a trailer 10. The socket 200 may be closeable by the spring-loaded cap 214. The spring-loaded cap 214 may be hinged from the socket flange proximal face 206.

The barrel 210 may be generally circular and may include (e.g., carry) a plurality of socket terminals 202 (e.g., seven male terminals), which are at distal ends of the pins 201 accessible in the socket sleeve 212. Therefore, the socket terminals 202 may be arranged in a same array as that of the pins (e.g., according to the SAE standard J560). The barrel 210 may be adapted to mate with a sleeve 106 of the plug 100 (see FIG. 4). The socket terminals 202 (e.g., male socket terminals) and plug terminals 102 (e.g., female plug terminals) may be configured to axially engage and to axially disengage. The positions (e.g., the types) of the socket terminals 202 and the plug terminals 102 may be reversed, if desired. For example, the socket terminals 202 may be female terminals and the plug terminals 102 may be male terminals.

In other words, while embodiments of the disclosure presented above have been shown and described as comprising a plug 100 with female terminals so that a mating socket 200 has male terminals, it is within the scope of the present disclosure for the electrical terminals to be reversed so that the plug 100 has male terminals and the mating socket 200 has female terminals, or for the plug and the socket to have other electrical connections. If the plug 100 is constructed to comply with a particular SAE or ISO standard, then the plug 100 may mate with any socket that has also been constructed according to the standard.

Referring to FIG. 4, the plug body 104 may have a generally round shape and may have a proximal end P facing the socket 200 and a distal end D extending away from the socket 200 when the two are mated. The proximal end may carry a plurality of plug terminals 102 (e.g., female plug terminals) that extend into the plug body 104 in an array, which matches the array of the socket terminals 202 (see FIG. 3D). The plug body 104 may include the sleeve 106 (e.g., an annular sleeve), which may axially extend from the proximal end of the plug 100 outwardly from the plug terminals 102 to form a proximal cavity 108 (e.g., an annular cavity). The proximal cavity 108 may be of a suitable diameter to receive the barrel 210 with a snug fit. For example, a diameter of the proximal cavity 108 and a diameter (e.g., an outer diameter) of the barrel 210 may be matched, such that the plug body 104 and the barrel 210 may be mechanically secured to one another. The distal end of the plug body 104 may be coupled to the cable 110 (e.g., a multi-conductor electrical cable or plug cable).

Figure 5B:
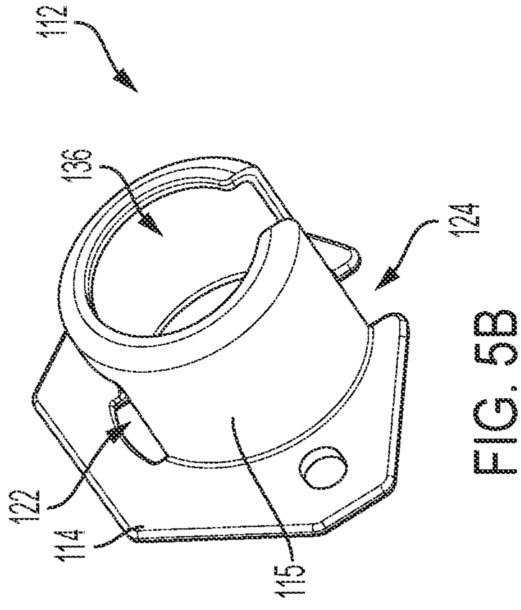
FIGS. 5A-5B illustrate perspective views of a cover of the plug, according to some embodiments of the present disclosure.

Referring again to FIG. 3D, the cover 112 may include the cover flange 114 (e.g., a peripheral integral flange or a plug flange) radially extending circumferentially from the outer perimeter of the cover 112 (see FIG. 5B). The cover flange 114 may have the same or substantially the same outer perimeter shape as that of the perimeter of the socket flange 204 (see FIG. 2).

The connection of the plug 100 to the socket 200 may be completed by inserting the barrel 210 into the proximal cavity 108 in the plug body 104 to cause mating of the socket terminals 202 and the plug terminals 102 and by mating of the socket flange distal face 208 of the socket flange 204 with a proximal face of the cover flange 114. The connection may be mechanically secured together by fastening hardware (e.g., bolts and nuts), the bolts passing through corresponding mounting holes 50 formed in the socket flange 204, the cover flange 114, and the wall 22 (e.g., the wall of the tractor 20 or trailer 10). As such, the cover flange 114 may be securely clamped between the wall 22 and the socket flange 204. In some embodiments, a gasket 320 may be securely clamped between the wall 22 and the cover flange 114 (see FIG. 12B).

In some embodiments, the cover flange 114 may be made larger in size and area than the socket flange 204. In such examples, the outer margins of the cover flange 114 may be formed to fit over the edges of the socket flange 204.

Figure 5D:
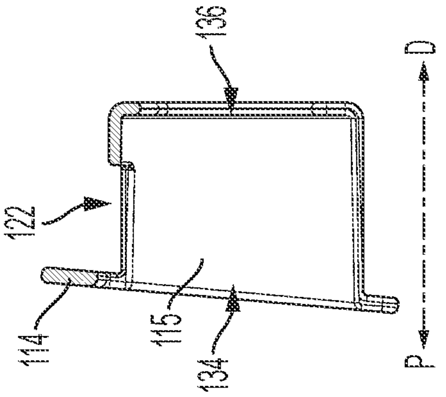
FIGS. 5C-5D respectively illustrate a proximal view and a longitudinal cross-sectional view of the cover taken along line BB, according to some embodiments of the present disclosure.
Figure 5A:
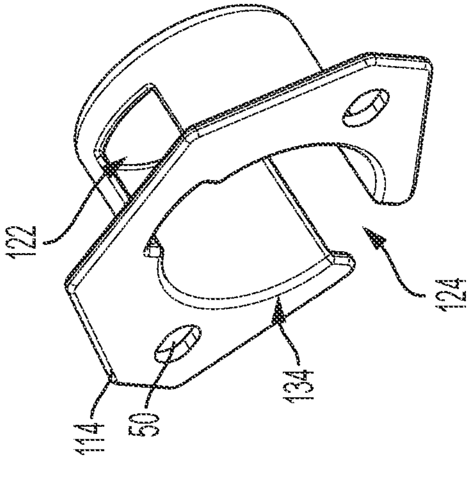

FIGS. 5A-5B illustrate perspective views of a cover of the plug, according to some embodiments of the present disclosure.

Figure 5C:
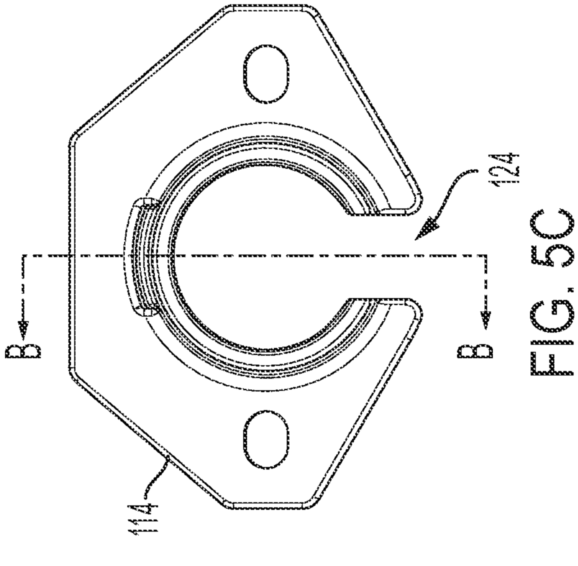

FIGS. 5C-5D respectively illustrate a proximal view and a longitudinal cross-sectional view of the cover taken along line BB, according to some embodiments of the present disclosure.

Referring to FIGS. 5A-5D, the cover 112 may have a keyway opening 122 corresponding in location to an orienting key projection 216 that is defined on the exterior of the barrel 210 (see FIGS. 2 and 3B). When properly connected, the orienting key projection 216 may protrude through the keyway opening 122 and may orient the cover 112. However, embodiments of the present disclosure are not limited as such, and the cover 112 and barrel 210 may not utilize a keyway opening 122 or an orienting key projection 216. The bottom of the cover 112 may have a longitudinal opening 124 that is sized to allow the cable 110 to pass therethrough. During installation, the longitudinal opening 124 allows the cover 112 to be pulled over the other components of the plug 100 to keep the components connected together when the cover 112 is coupled (e.g., clamped) to the socket 200. For example, the longitudinal opening 124 may provide some flexibility to the structure of the cover 112 to allow the cover to be fitted over the plug body 104 and over the barrel 210.

Figure 6C:
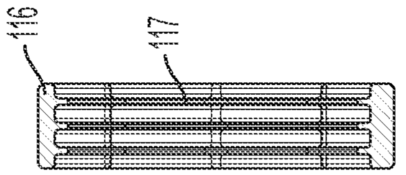
FIGS. 6B-6C respectively illustrate a proximal view and a cross-sectional view of the wiper seal taken along line CC, according to some embodiments of the present disclosure.
Figure 6B:
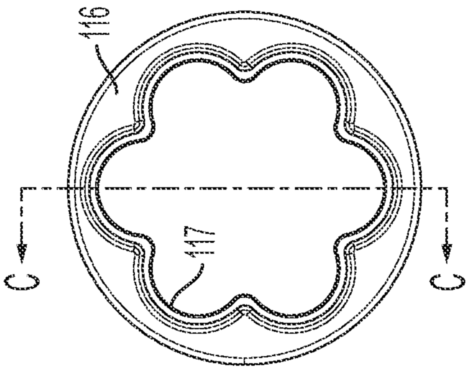
Figure 6A:
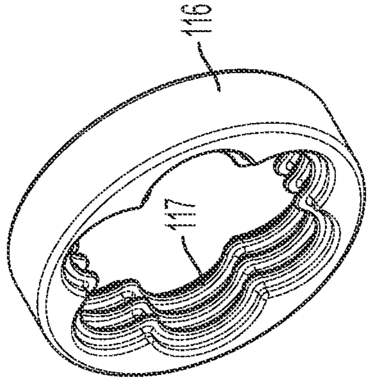
FIG. 6A illustrates a perspective view of the wiper seal of the plug, according to some embodiments of the present disclosure.

FIG. 6A illustrates a perspective view of the wiper seal of the plug, according to some embodiments of the present disclosure.

FIGS. 6B-6C respectively illustrate a proximal view and a cross-sectional view of the wiper seal taken along line CC, according to some embodiments of the present disclosure.

Referring to FIGS. 6A-6B, in some embodiments, the plug 100 may include a wiper seal 116 that fits within the proximal cavity 108 of the plug body 104 (see FIG. 4). The wiper seal 116 may be configured to accommodate the barrel 210 and socket terminals 202 of the socket 200 (see FIG. 3D). For example, the wiper seal 116 may include a hole (or holes) therethrough to allow a distal end of the barrel 210 including the socket terminals 202 to fit through the wiper seal 116 and connect with the plug terminals 102.

As shown in FIGS. 6A-6C, the wiper seal 116 may have an outer shape (e.g., a generally circular outer shape) that conforms to the shape of the sleeve 106 (see FIG. 4) and may have an interior shape that conforms to the shape of the distal end of the barrel 210 (see FIG. 2). When the plug 100 and the socket 200 are mated, the shape of the wiper seal 116 allows the wiper seal 116 to come in close contact with the inner surface of the sleeve 106 and the outer portion of the barrel 210, as the barrel 210 protrudes within the proximal cavity 108 (see FIG. 3D). For example, the wiper seal 116 may be configured to be compressed around a distal end of the barrel 210. Accordingly, the barrel 210, the wiper seal 116, and the plug body 104 may form a moisture-resistance seal around the socket terminals 202 and the plug terminals 102. In some embodiments, the wiper seal 116 may have a plurality of wiper seal grooves 117 (e.g., a plurality of semicircular grooves) configured to match the exterior form of corresponding portions of the barrel 210 (see FIG. 2).

Figure 7A:
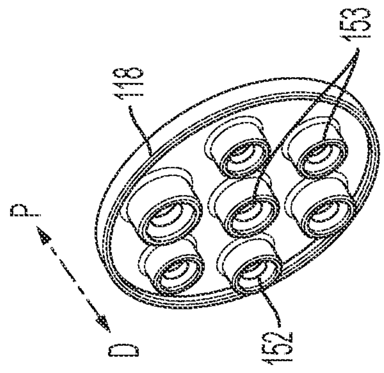
FIGS. 7A-7B illustrate perspective views of the wire seal of the plug, according to some embodiments of the present disclosure.
Figure 7B:
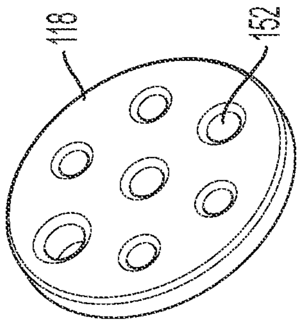

FIGS. 7A-7B illustrate perspective views of the wire seal 118 of the plug, according to some embodiments of the present disclosure.

Figure 7C:
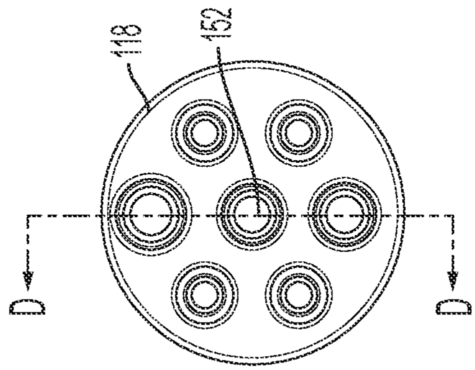
FIGS. 7C-7D respectively illustrate a distal view and a cross-sectional view of the wire seal taken along line DD, according to some embodiments of the present disclosure.
Figure 7D:
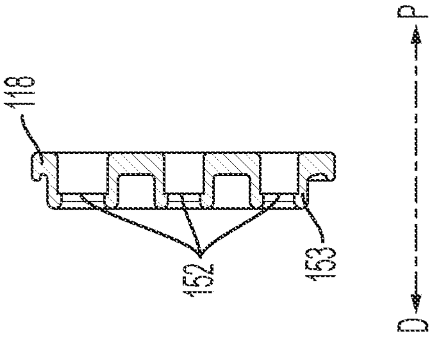

FIGS. 7C-7D respectively illustrate a distal view and a cross-sectional view of the wire seal 118 taken along line DD, according to some embodiments of the present disclosure.

Figure 8A:
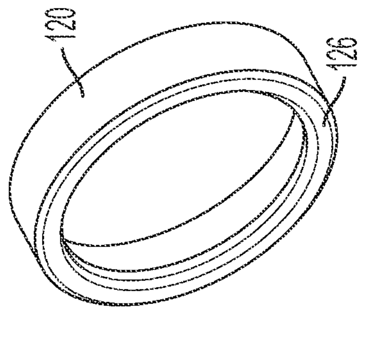
FIGS. 8A-8B illustrate perspective views of the retaining ring of the plug, according to some embodiments of the present disclosure.
Figure 8B:
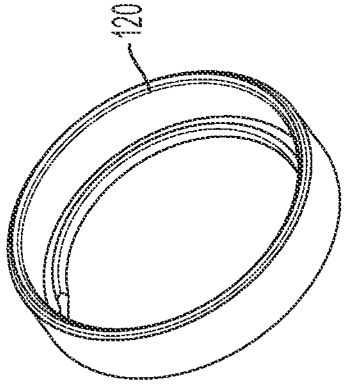

FIGS. 8A-8B illustrate perspective views of the retaining ring 120 of the plug, according to some embodiments of the present disclosure.

Figure 8C:
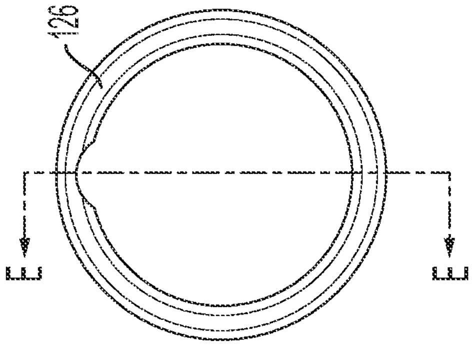
FIGS. 8C-8D respectively illustrate a distal view and a cross-sectional view of the retaining ring taken along line EE, according to some embodiments of the present disclosure.
Figure 8D:
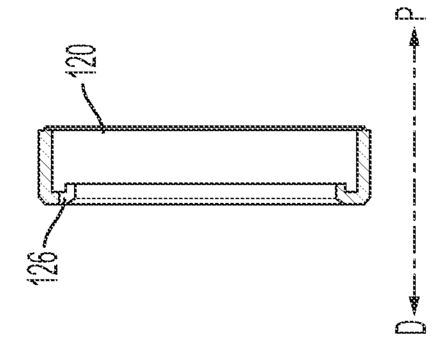

FIGS. 8C-8D respectively illustrate a distal view and a cross-sectional view of the retaining ring 120 taken along line EE, according to some embodiments of the present disclosure.

In some embodiments, the plug 100 may include a wire seal 118 and a retaining ring 120 at the distal end of plug body 104 (see FIG. 3D).

Referring to FIGS. 7A-7D, the wire seal 118 may be formed of a flexible material, such as an elastomer, and the retaining ring 120 may be made of a rigid material, such as rigid plastic. The wire seal 118 may include (e.g., may form) a plurality of wire seal openings 152. The wire seal openings 152 may be sized to fit the plug terminals 102 and may be arranged in an array that is substantially the same as the array of the socket terminals 202. Each of the wire seal openings 152 may be surrounded by a wire seal opening sleeve 153. Each wire seal opening sleeve 153 may form a seal (e.g., a water-resistant seal) around a corresponding wire 15 (see FIG. 3B). For example, the wire seal 118 may be configured to be compressed around a plurality of wires 15 of the cable 110 at the wire seal opening sleeves 153 and/or the wire seal openings 152. In some embodiments, the wire seal 118 may be integrally formed (e.g., monolithically formed) as one component (or body). In some embodiments, the wire seal opening sleeves 153 may be configured to be inserted through the retainer opening 136.

As shown in FIGS. 8A-8D, the retaining ring 120 may have a ring shape. The retaining ring 120 may have an inner diameter that is substantially the same as the outer diameter of the wire seal 118 and an outer diameter of the distal end of the plug body 104 (e.g., see FIG. 3D). The inner diameter of the retaining ring 120 and a retaining edge 126 at a distal end of the retaining ring 120 may allow the retaining ring 120 to encapsulate (e.g., to partially encapsulate) the wire seal 118 and to press (e.g., hold or secure) the wire seal 118 against the distal end of the plug body 104 when the cover 112 is in position (e.g., mounted to the plug 100 and coupled to the socket flange 204). Thus, the wire seal 118 and retaining ring 120 may prevent or substantially prevent moisture and/or debris from reaching the interior of the plug 100, including the socket terminals 202 and the plug terminals 102, from the rear exterior (e.g., the distal end exterior) of the plug 100.

Figure 9A:
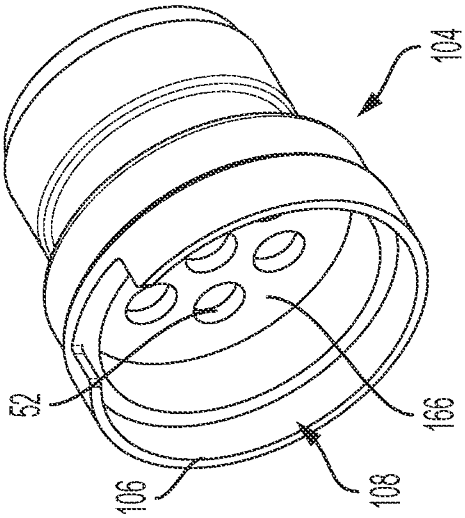
FIGS. 9A-9B illustrate perspective views of the plug body of the plug, according to some embodiments of the present disclosure.
Figure 9B:
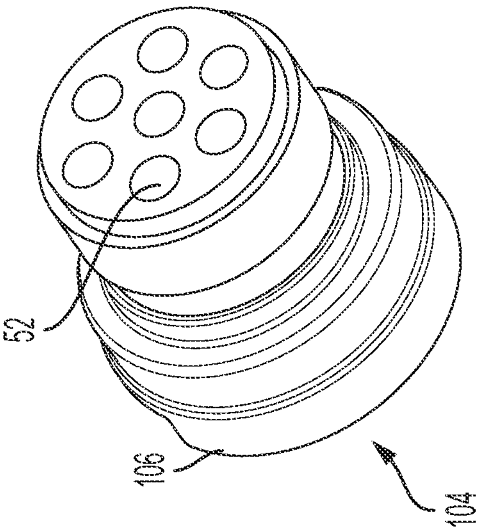

FIGS. 9A-9B illustrate perspective views of the plug body 104 of the plug, according to some embodiments of the present disclosure.

Figure 9C:
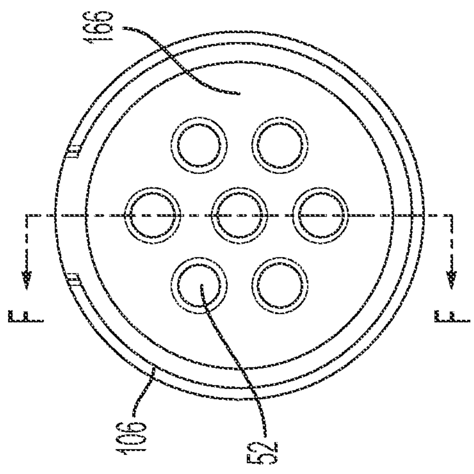
FIGS. 9C-9D respectively illustrate a proximal view and a cross-sectional view of the plug body taken along line FF, according to some embodiments of the present disclosure.
Figure 9D:
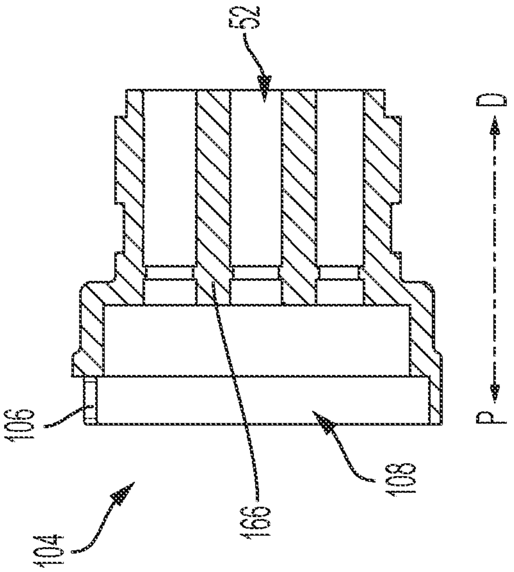

FIGS. 9C-9D respectively illustrate a proximal view and a cross-sectional view of the plug body 104 taken along line FF, according to some embodiments of the present disclosure.

Referring to FIG. 9A-9D, in some embodiments, the plug body 104 may include a proximal cavity 108 at a proximal end of the plug body 104 and may include terminal holes 52 at a distal end of the plug body 104. The terminal holes 52 may extend through the plug body 104 to a mounting floor 166 of the plug body 104. The mounting floor 166 may be a surface within the plug body 104 where the plug terminals 102 and the socket terminals 202 meet (e.g., mate). The sleeve 106 may surround (e.g., may form) the proximal cavity 108, along with the mounting floor 166.

Figure 10:
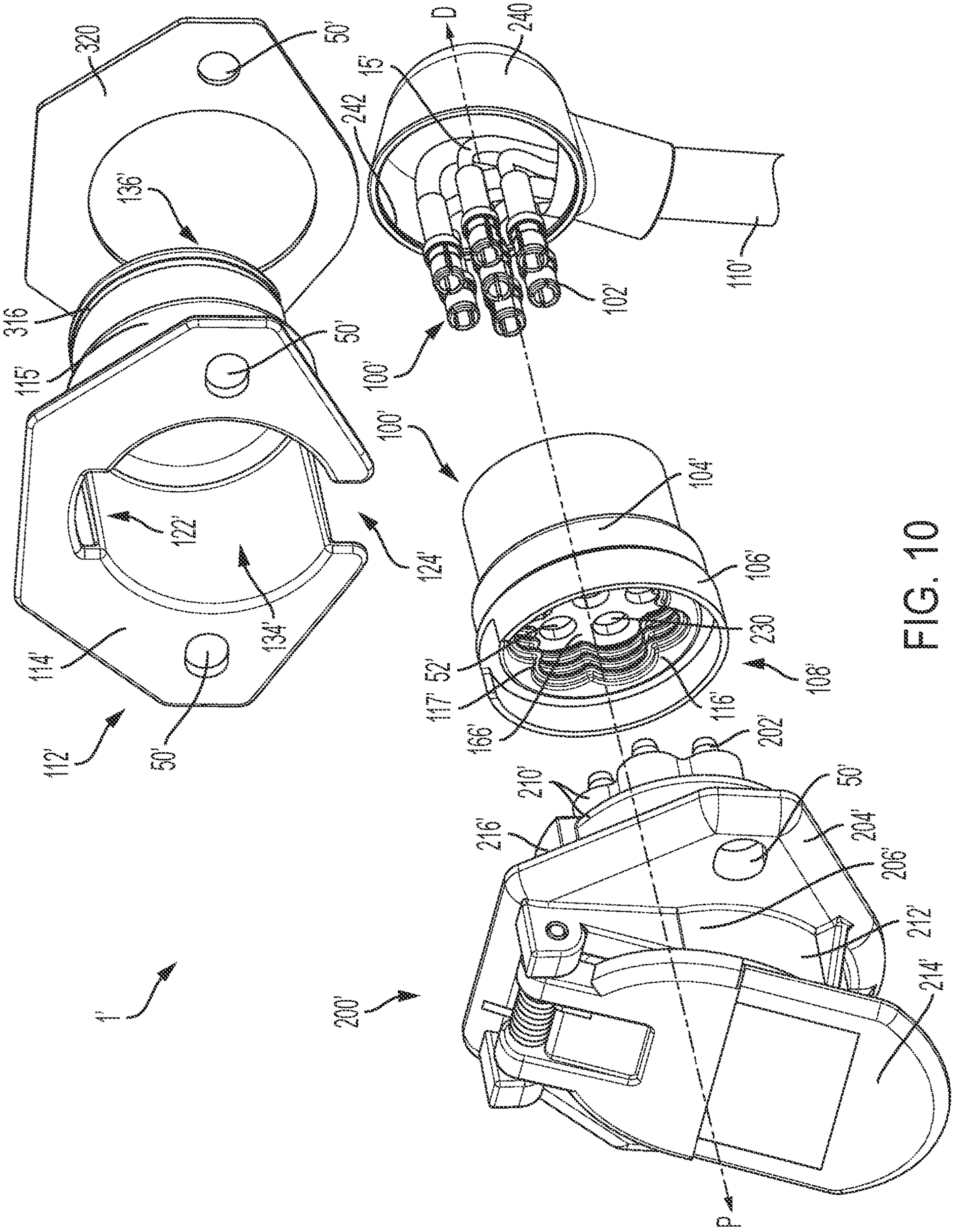
FIG. 10 illustrates an exploded socket-side view of an angled plug-and-socket assembly, according to some embodiments of the present disclosure.

FIG. 10 illustrates an exploded socket-side view of an angled plug-and-socket assembly, according to some embodiments of the present disclosure.

Figure 11:
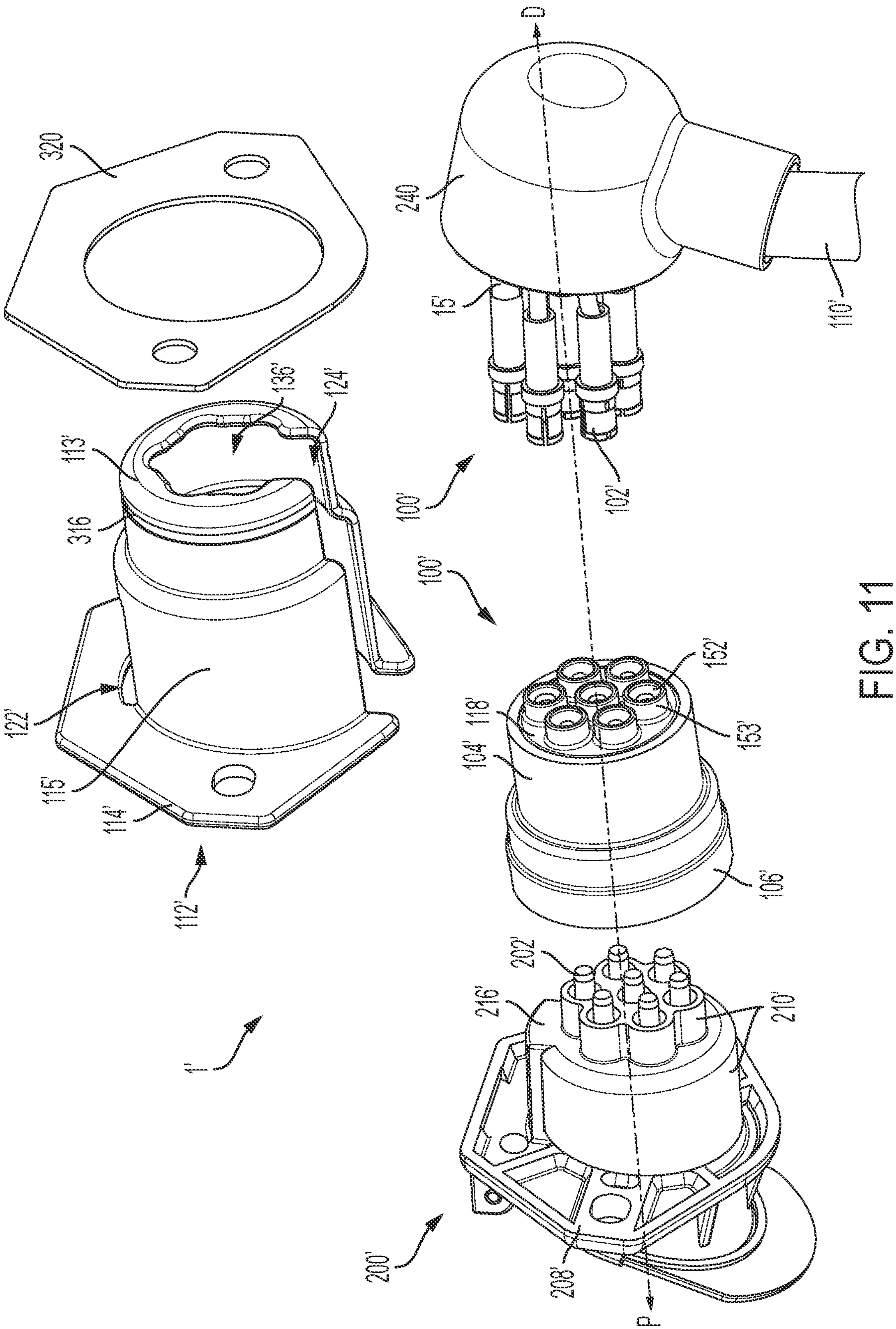
FIG. 11 illustrates an exploded plug-side view of the angled plug-and-socket assembly, according to some embodiments of the present disclosure.

FIG. 11 illustrates an exploded plug-side view of the angled plug-and-socket assembly, according to some embodiments of the present disclosure.

Referring to FIGS. 10-11, it should be understood that many of the features depicted in FIGS. 10-11 may have the same, or similar, functions to corresponding features depicted in FIG. 2. For example, the features and functions of a socket 200' depicted in FIG. 10 may be the same as the features and functions of the socket 200 depicted in FIG. 2. As such, the disclosure of features and functions corresponding to both the socket 200 and the socket 200' that are the same may not be repeated.

Figure 12A:
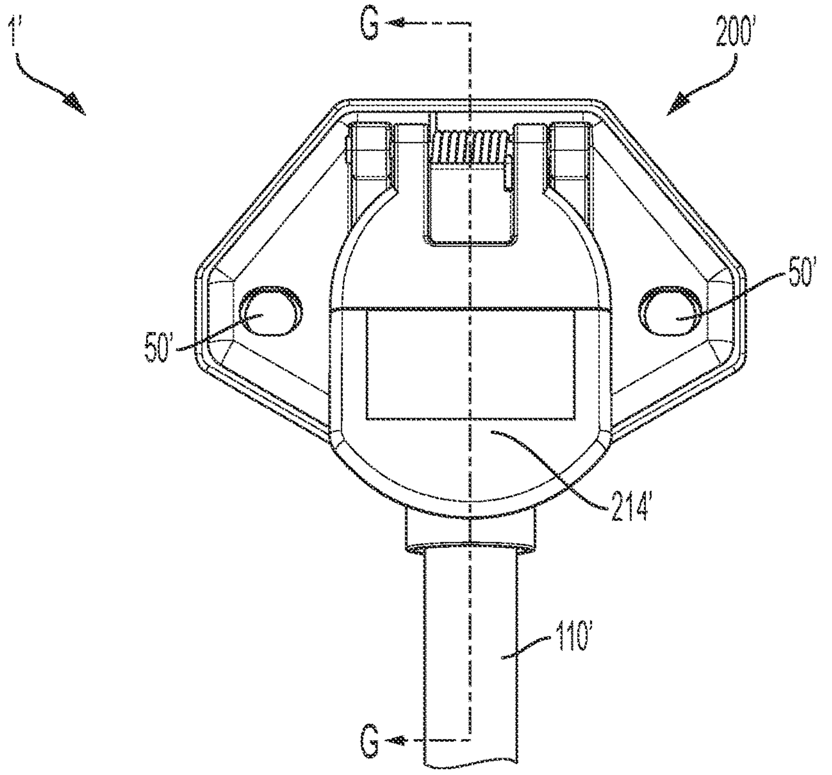
FIGS. 12A-12B respectively illustrate a proximal view of the angled plug-and-socket assembly and a longitudinal cross-sectional view of the angled plug-and-socket assembly in the mated state taken along line GG, according to some embodiments of the present disclosure.
Figure 12B:
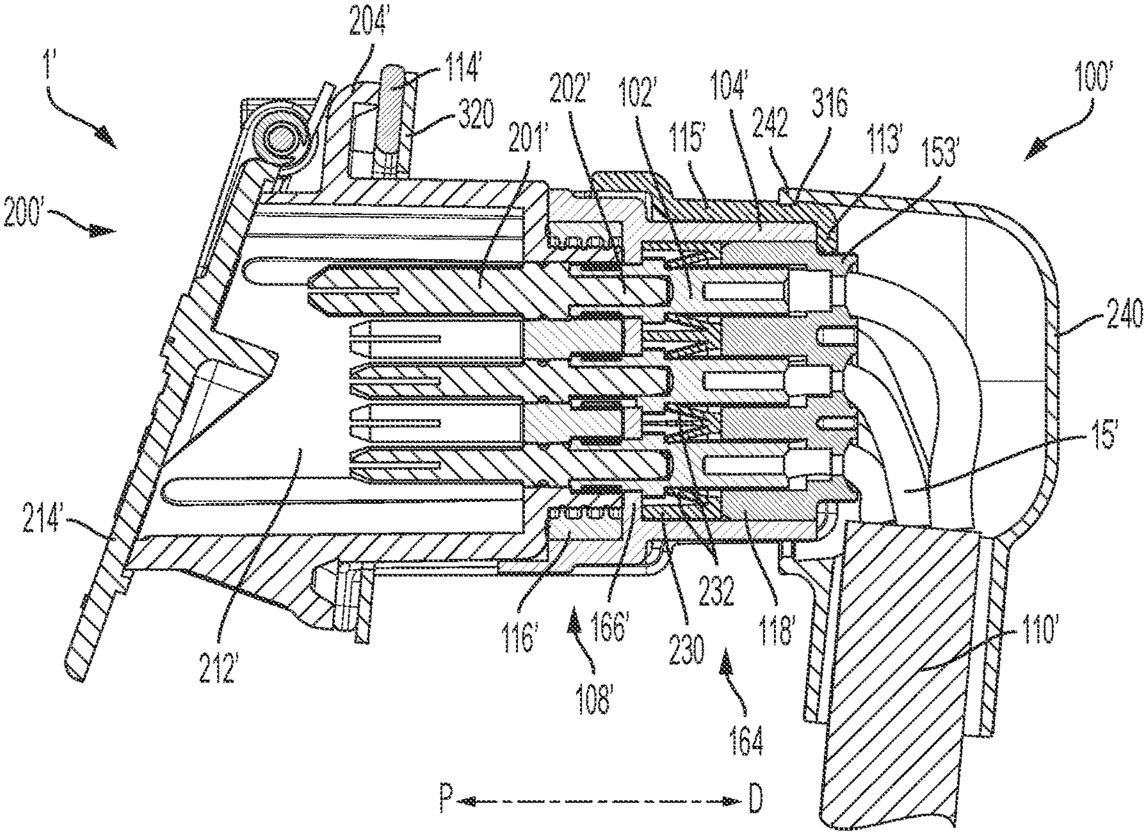
Figure 13B:
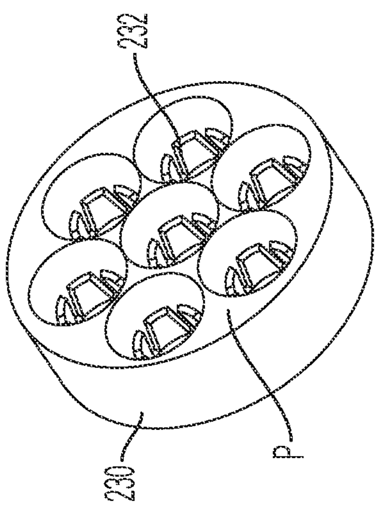
FIGS. 13A-13B illustrate perspective views of a terminal retainer of the plug, according to some embodiments of the present disclosure.
Figure 13E:
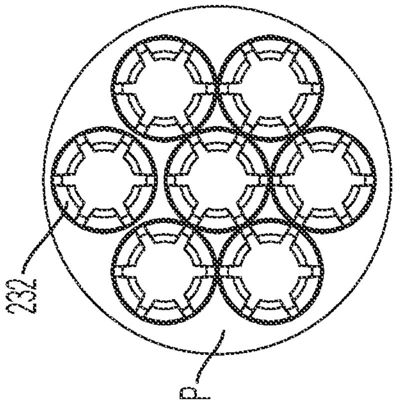
FIGS. 13C-13E respectively illustrate a distal view, a cross-sectional view, and a proximal view of the terminal retainer along line HH, according to some embodiments of the present disclosure.
Figure 13D:
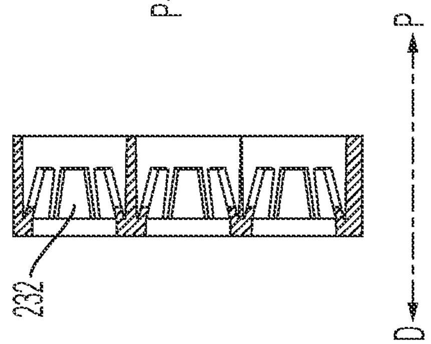

Referring to FIG. 10, a plug body 104' may include a terminal retainer 230 (see also FIGS. 12B and 13D). The terminal retainer 230 may be mounted (e.g., sonic welded to the plug body 104') beneath a mounting floor 166'. A cable 110' and wires 15' may extend laterally (e.g., may extend at a right angle) from the plug body 104'. The plug 100' may include a plug back cover 240 (e.g., a back cap). The plug back cover 240 may include a latching portion 242 extending along an interior periphery of the plug back cover 240.

A cover 112' may include a cover groove 316. The latching portion 242 may be secured to a distal end of the cover 112' by latching onto the cover groove 316 (see also FIG. 12B).

A gasket 320 may be mounted to a distal surface of a cover flange 114' by way of mounting holes 50'. The gasket 320 may include a relatively soft or hard material and may provide sealing and/or adhesion or in the case of utilizing a hard material act as a spacer between the distal surface of the cover flange 114' and an exterior portion of the wall 22 while under compression to prevent water from entering through the plug-and-socket mounting hole in the wall 22. The gasket 320 may also dampen vibrations at the distal surface of the cover flange 114' and an exterior portion of the wall 22.

Figures 14A, 14B, 14C, 14D:
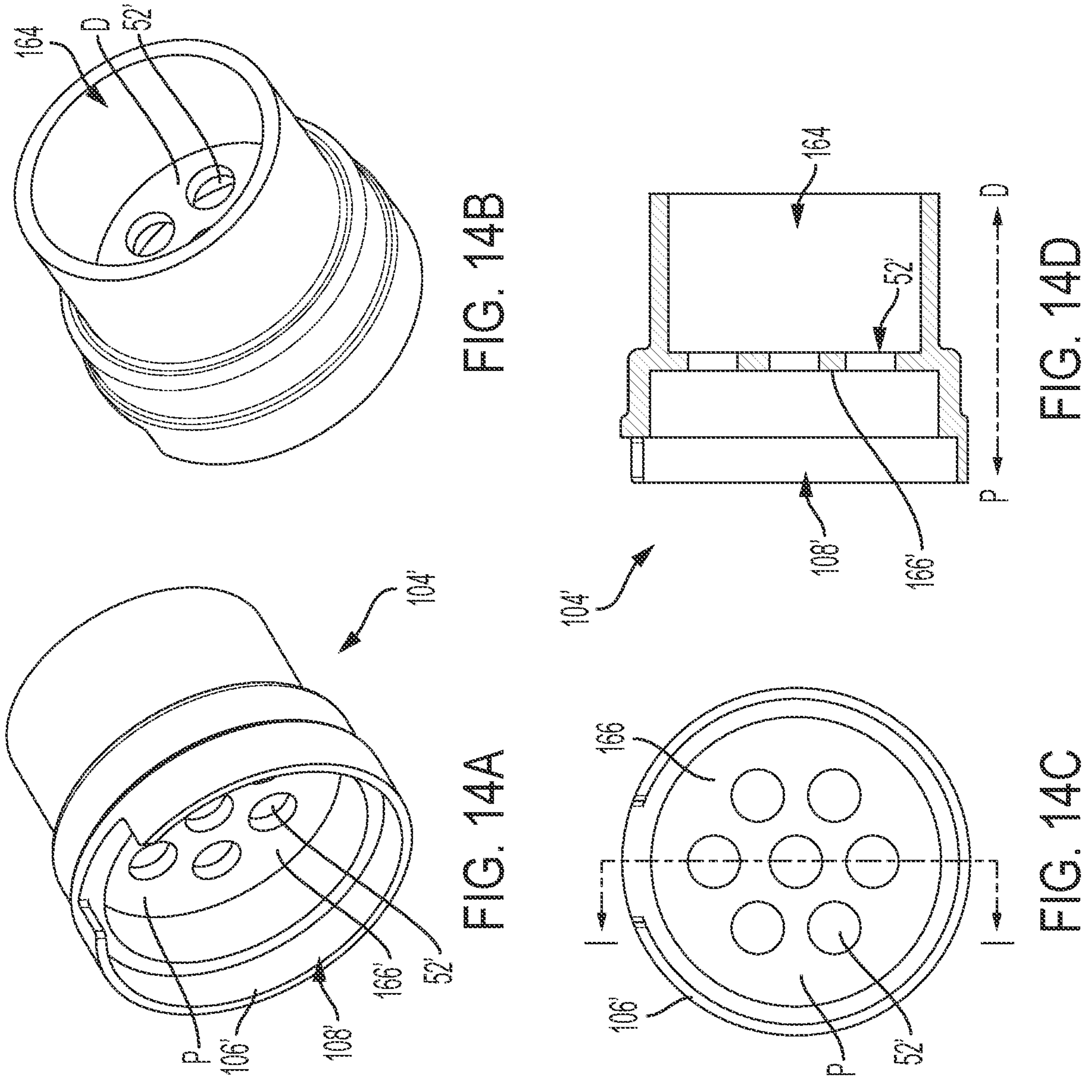
FIGS. 14A-14B illustrate perspective views of the plug body of the plug, according to some embodiments of the present disclosure.
FIGS. 14C-14D respectively illustrate a proximal view and a cross-sectional view of the plug body taken along line II, according to some embodiments of the present disclosure.

Referring to FIG. 11, a distal end of the plug body 104' may include the wire seal 118' at a distal end of a distal cavity 164 in the plug body 104' (see FIGS. 12B and 14D). A cover body 115' may be configured to mount over the barrel 210' of the socket 200' and over a portion of the plug body 104'. A distal end of the cover 112' may include a cover retaining portion 113' that is configured to extend along a periphery (e.g., a portion of the periphery) of the distal end of the plug body 104', and to overlap a portion of the wire seal 118' at the periphery of the distal end of the plug body 104'. Accordingly, the cover retaining portion 113' may secure the wire seal 118' in place between the cover flange 114' and the cover retaining portion 113' when the cover 112' is mounted to the plug body 104' and coupled to the socket flange distal face 208'.

FIGS. 12A-12B respectively illustrate a proximal view of the angled plug-and-socket assembly 1' and a longitudinal cross-sectional view of the angled plug-and-socket assembly 1' in the mated state taken along line GG, according to some embodiments of the present disclosure.

Referring to FIGS. 12A-12B, the terminal retainer 230 may be located at a proximal end of the distal cavity 164 of the plug body 104'. The wire seal 118' may be located at a distal end of the distal cavity 164. A proximal end of the terminal retainer 230 may be coupled to the mounting floor 166'. The terminal retainer 230 may include latching mechanisms 232 corresponding to respective terminal holes 52' in the terminal retainer 230. For example, a latching mechanism 232 may be configured to accommodate an insertion of a plug terminal 102' through a distal end of the terminal retainer 230 and to resist a removal of the plug terminal 102' from the terminal retainer 230. Accordingly, the terminal retainer 230 may prevent the plug terminals 102' from slipping away from the plug body 104'.

In some embodiments, the latching mechanism 232 may include angled structures that cause a corresponding terminal hole 52' to narrow from a distal end of the terminal retainer 230 to a proximal end of the terminal retainer 230. The latching mechanism 232 may be configured flexibly to open to allow the plug terminal 102' to be inserted and then close to latch onto an edge of the plug terminal 102'.

The plug back cover 240 may prevent water and debris from entering the area at the distal end of the plug body 104' corresponding to the wires 15' and the cable 110'.

The terminal retainer 230 and/or the plug back cover 240 may include (e.g., may be) a relatively semi-rigid plastic material. For example, the semi-rigid plastic material may include nylon or Acrylonitrile Butadiene Styrene (ABS).

Figure 13A:
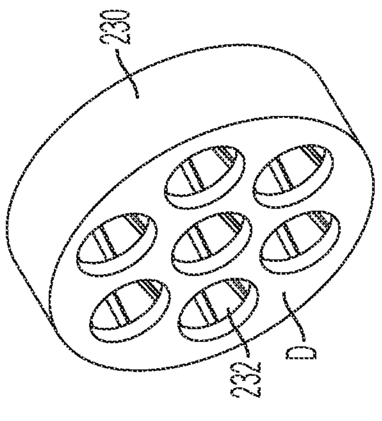

FIGS. 13A-13B illustrate perspective views of a terminal retainer 230 of the plug, according to some embodiments of the present disclosure.

Figure 13C:
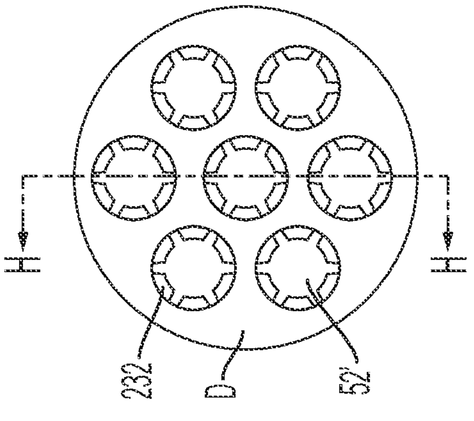

FIGS. 13C-13E respectively illustrate a distal view, a cross-sectional view, and a proximal view of the terminal retainer 230 along line HH, according to some embodiments of the present disclosure.

Referring to FIGS. 13A-13E, and as discussed above, the terminal retainer 230 may include a plurality of terminal holes 52' corresponding to respective plug terminals 102'. Each terminal hole 52' may include a latching mechanism 232. As discussed briefly above, each latching mechanism 232 may be configured to accommodate an insertion of a corresponding plug terminal 102' through the distal end of the terminal retainer 230 and to resist a removal of the corresponding plug terminal 102' from the terminal retainer 230. Accordingly, the terminal retainer 230 may prevent the plug terminals 102' from slipping away from the plug body 104'.

Referring to FIG. 13D, in some embodiments, the latching mechanism 232 may include angled structures that cause a corresponding terminal hole 52' to narrow from a distal end of the terminal retainer 230 to a proximal end of the terminal retainer 230. Accordingly, the latching mechanism 232 may be configured to flexibly open (e.g., be pushed outward by the corresponding plug terminal 102') to allow the plug terminal 102' to be inserted through the corresponding terminal hole 52'. After the latching mechanism 232 is opened to accommodate a large diameter of an edge portion of the corresponding plug terminal 102', the latching mechanism 232 may then close onto a smaller diameter that is distal to the edge portion of the corresponding plug terminal 102' (see FIG. 12B). The corresponding plug terminal 102' may be secured (e.g., trapped) in place between the mounting floor 166' and the latching mechanism 232.

FIGS. 14A-14B illustrate perspective views of the plug body 104' of the plug, according to some embodiments of the present disclosure.

FIGS. 14C-14D respectively illustrate a proximal view and a cross-sectional view of the plug body 104' taken along line II, according to some embodiments of the present disclosure.

Referring to FIGS. 14A-14D, in some embodiments the plug body 104' may include the mounting floor 166', which separates the proximal cavity 108' from the distal cavity 164. The mounting floor 166' may include a plurality of mounting holes 52', which may spatially connect the proximal cavity 108' and the distal cavity 164. The distal end of the plug body 104' may be configured to accommodate the terminal retainer 230 and the wire seal 118' within the distal cavity 164 (see FIG. 12B). The plug body 104' may be configured to be coupled with a distal end of the cover 112', such that the cover retaining portion 113' of the cover 112' may extend along a portion of the periphery of the distal end of the plug body 104' to overlap a portion of the wire seal 118' at the periphery of the distal end of the plug body 104'. Accordingly, the plug body 104' may be configured to allow the cover retaining portion 113' to secure the wire seal 118' in place between a distal end of the terminal retainer 230 and the cover retaining portion 113'. For example, a portion of the outer shape of the plug body 104' may be formed substantially to match a portion of an inner shape of the cover 112', such that when the cover 112' is mounted to the plug body 104' (and coupled to the socket flange distal face 208'), the wire seal 118' may be secured in place between the cover flange 114' and the cover retaining portion 113'. For example, in some embodiments, the wire seal 118' may be secured between the terminal retainer 230 and the cover retaining portion 113'. For example, the terminal retainer 230 may be located at a proximal end of the distal cavity 164 and the wire seal 118' may be located at a distal end of the distal cavity 164.

Although the present disclosure has been particularly shown and described with reference to exemplary embodiments thereof, it will be understood by those of ordinary skill in the art that features of different embodiments may be combined to form further embodiments, and that various changes, modifications and adaptations in form and details of the present disclosure are possible without departure from the spirit and scope of the present disclosure. Thus, the present disclosure has been described by way of illustration and not limitation, and is defined by the following claims and their equivalents.

What is claimed is:

1. A plug-and-socket assembly comprising:
- a plug configured to be electrically and mechanically coupled with a socket; and
- a cover configured to be mounted over a portion of the plug and a portion of the socket, the cover comprising:
  - a flange forming a first opening at a proximal end of the cover and configured to be coupled to the socket;
  - a retaining portion forming a second opening at a distal end of the cover, and configured to secure a plug component between the flange and the retaining portion; and
  - a cover body extending from the flange to the retaining portion and forming a longitudinal opening extending from the first opening to the second opening, the longitudinal opening defining a separation at an exterior surface of the cover and extending continuously from the flange to the retaining portion to expose the plug to the outside when the plug is secured to the socket.

2. The plug-and-socket assembly of claim 1, further comprising the socket, wherein the socket comprises a barrel that is configured to be inserted through the first opening.

3. The plug-and-socket assembly of claim 2, wherein the plug comprises:
- a plug body;
- a first seal at a proximal end of the plug body and comprising a flexible material configured to be compressed around a distal end of the socket; and
- a second seal at a distal end of the plug body and comprising a flexible material configured to be compressed around a wire of a cable.

4. The plug-and-socket assembly of claim 3, wherein the plug component is the second seal and the retaining portion is configured to secure the second seal to the distal end of the plug body by overlapping a portion of the second seal along a portion of a periphery of the distal end of the plug body.

5. The plug-and-socket assembly of claim 4, wherein the second seal comprises a wire seal opening sleeve configured to be inserted through the second opening.

6. The plug-and-socket assembly of claim 3, wherein the second seal forms a plurality of wire seal openings configured to surround respective wires of the cable, portions of the second seal forming the plurality of wire seal openings being integrally formed.

7. The plug-and-socket assembly of claim 3, wherein the plug body comprises a proximal cavity at a proximal end of the plug body and a distal cavity at the distal end of the plug body.

8. The plug-and-socket assembly of claim 7, wherein the distal cavity accommodates a terminal retainer forming a terminal hole comprising a latching mechanism, the latching mechanism being configured to accommodate an insertion of a plug terminal through the terminal hole and to resist a removal of the plug terminal from the terminal hole.

9. The plug-and-socket assembly of claim 8, wherein the terminal retainer is located at a proximal end of the distal cavity and the second seal is located at a distal end of the distal cavity.

10. The plug-and-socket assembly of claim 7, wherein the proximal cavity is separated from the distal cavity by a mounting floor forming a terminal hole to spatially connect the proximal cavity with the distal cavity, the proximal cavity accommodating the first seal.

11. The plug-and-socket assembly of claim 10, wherein the first seal comprises one or more semicircular grooves configured to match an exterior form of the distal end of the socket.

12. The plug-and-socket assembly of claim 1, wherein the longitudinal opening is configured to allow the cover to be fitted over a plug body.

13. The plug-and-socket assembly of claim 1, wherein a distal end of the cover body comprises a groove configured to be coupled with a latching portion of a plug back cover.

14. A cover comprising:
- a flange forming a first opening at a proximal end of the cover and configured to be coupled to a socket;
- a retaining portion forming a second opening at a distal end of the cover, and configured to secure a component of a plug between the flange and the retaining portion; and
- a cover body extending from the flange to the retaining portion and configured to be mounted over a portion of the plug and a portion of the socket, the cover body forming a longitudinal opening extending from the first opening to the second opening, the longitudinal opening defining a separation at an exterior surface of the cover and extending continuously from the flange to the retaining portion to expose the plug to the outside when the plug is secured to the socket.

15. The cover of claim 14, wherein the first opening is configured to accommodate the socket.

16. The cover of claim 14, wherein the longitudinal opening is configured to allow the cover to be fitted over a plug body.

17. A plug comprising:
a plug body;
a first seal at a proximal end of the plug body and comprising a flexible material configured to be compressed around a distal end of a socket; and
a second seal at a distal end of the plug body and comprising a flexible material forming a plurality of wire seal openings, the second seal being configured to:
be compressed around a plurality of wires; and
be secured to the distal end of the plug body by a retaining portion of a removable cover, the retaining portion extending along a periphery of the distal end of the plug body,
wherein the second seal comprises a plurality of wire seal opening sleeves formed around corresponding ones of the plurality of wire seal openings.

18. The plug of claim 17, wherein portions of the second seal forming the plurality of wire seal openings are integrally formed.

19. The plug of claim 17, wherein the plug body comprises a proximal cavity at a proximal end of the plug body and a distal cavity at the distal end of the plug body.

20. The plug of claim 19, wherein the distal cavity accommodates a terminal retainer forming a terminal hole comprising a latching mechanism, the latching mechanism being configured to accommodate an insertion of a plug terminal through the terminal hole and to resist a removal of the plug terminal from the terminal hole.

* * * * *